United States Patent [19]

Ritchie

[11] Patent Number: 4,829,421
[45] Date of Patent: May 9, 1989

[54] DATA TRANSFER REGULATING SYSTEM FOR RECORDING DATA AT A VARYING RECORDING RATE

[75] Inventor: Wallace A. Ritchie, Somers, N.Y.

[73] Assignee: S. C. Yuter, J.S.D., Briarcliff Manor, N.Y.

[21] Appl. No.: 668,221

[22] Filed: Nov. 5, 1984

[51] Int. Cl.$^4$ ............................................. G06F 11/34
[52] U.S. Cl. ................................................. 364/200
[58] Field of Search ... 364/200 MS File, 900 MS File

[56] References Cited

U.S. PATENT DOCUMENTS

| 3,665,417 | 5/1972 | Low et al. | 364/200 |
|---|---|---|---|
| 3,753,246 | 8/1973 | Kiffmeyer | 364/900 |
| 3,774,156 | 11/1973 | Marsalka | 364/200 |
| 3,999,169 | 12/1976 | Perschy | 364/200 |
| 4,003,027 | 1/1977 | DiMatteo | 364/900 |
| 4,012,721 | 3/1977 | Lindsay | 364/900 |
| 4,030,072 | 6/1977 | Bjornsson | 364/200 |
| 4,126,895 | 11/1978 | Weemaes et al. | 364/200 |
| 4,143,418 | 3/1979 | Hodge | 364/200 |
| 4,228,499 | 10/1980 | Springolo et al. | 364/200 |
| 4,327,411 | 4/1982 | Turner | 364/900 |
| 4,476,527 | 10/1984 | Clayton, IV | 364/200 |
| 4,499,536 | 2/1985 | Gemma et al. | 364/200 |

Primary Examiner—Raulfe B. Zache
Assistant Examiner—Emily Y. Chan
Attorney, Agent, or Firm—S. C. Yuter

[57] ABSTRACT

A system for transferring data from a data source such as a host computer to a data utilization device such as a remote high-speed line printer comprises a transmitter, communications circuit and receiver. The transmitter has a central processor which controls the transfer of data from an input section via a one line buffer to a communications storage buffer. The rate of transfer of data from the one line buffer is regulated by the available storage capacity of the communications storage buffer, with the higher the capacity the faster the rate of transfer.

19 Claims, 2 Drawing Sheets

DATA TRANSFER REGULATING SYSTEM FOR RECORDING DATA AT A VARYING RECORDING RATE

BACKGROUND OF THE INVENTION

1. Field of the Invention

This invention relates to data transfer systems and, more particularly, to a system for regulating the transfer of data from a data source such as a host computer to a data recording device such as a remote lineby-line printer.

2. Description of The Related Art

A remote line printer system generally consists of a transmitter unit, a communication circuit and, at the remote location, a receiver unit which drives a high-speed line-by-line printer. Such a system is disclosed in the co-pending U.S. patent application Ser. No. 618,994 filed June 11, 1984 as a continuation of Ser. No. 378,793 filed May 17, 1982, now abandoned and assigned to the same assignee ("the RLPS-1 system"). U.S. patent application Ser. No. 618,994 issued on Feb. 3, 1987 as U.S. Pat. No. 4,641,263.

A principal feature of the RLPS-1 system is that the transmitter couples to the print port of the host computer rather than to the communications port. The transmitter accepts bursts of data in parallel format, with each burst corresponding to a print line. After each burst, the transmitter converts the parallel data to serial data for communication to the remote location. At the remote location the receiver converts the serial data into corresponding bursts of parallel data to drive the high-speed line-by-line printer. The host computer thinks it is driving a local high-speed printer, and the remotely located high-speed printer thinks it is being driven by a local host computer.

The communications protocol between the transmitter and receiver units includes comprehensive error checking as well as facilities for compressing the amount of data required to describe one print line. The receiver unit senses errors and instructs the transmitter unit to retransmit the data error free. Compression includes the deletion of sequentially repeating binary digits. But a consequence of error checking and compression is that the rate of error-free and decompressed print lines varies so that the remote high-speed printer is driven at varying print line rates by its receiver.

While the RLPS-1 system achieved substantial commercial success, it created a demand for an even more efficient system, a system for more efficiently handling varying print line rates.

A typical print line with 132 data characters (including spaces) and one vertical formatting character (such as a line feed) can be transferred by the host computer at 500,000 characters per second; i.e. in 0.266 milliseconds. A 1200 line per minute (LPM) printer will print approximately 20 such lines per second, at about 50 milliseconds per line. Thus, data transfers from the host computer to the printer occupy about 0.5% (0.266/50) of the combined time to load and print a line.

Since data transfers from the host computer are so fast and only occupy a small percentage of the computer's operating time, the data transfers are only made on request from the local transmitter of the remote line printer system. The host computer is programmed to expect a request for a line of data (from what it believes is a local line printer) before a given maximum amount of time after the last request. For example, if a request for a new line is not made within one second of the previous line, the host computer might declare an error and invoke an error recovery process. Unnecessary error recovery processes could render the remote line printer system useless unless the host computer is suitably modified. Modifying the host computer defeats one of the purposes of the remote line printer system; that is, to look to the host computer as a local line printer.

The remote line print printer system transfers print lines to the remote end. Because of the communication error correcting protocol, the compression of data and other factors, the rate of data transfer as measured in lines per unit of time may vary over a much wider range than that expected by the host computer from a local line printer. Further, the variation depends on the amount of time over which the data transfers are monitored by the host computer. For example, when viewed over a one second interval, the data transfer rate may be zero lines if a burst of communication circuit errors prevents any data from being correctly transferred. Over an interval of twenty seconds, however, the performance may average to a rate similar to a local line printer. But the invocation by the host computer of undesired error recovery processes only depends on a given maximum amount of time between sequential requests for data.

BRIEF SUMMARY OF THE INVENTION

A principal object of the invention is to provide a remote line printer system which requests data transfers from a typical host computer which usually are well within the maximum time between sequential requests expected by the host computer from a local high-speed line printer.

A more specific object of the invention is to provide a remote line printer system which looks to a typical host computer as a local high-speed line printer yet minimizes undesired error recovery processes from unduly long periods of time between sequential requests for print lines.

A general object of the invention is to provide an improved system for regulating the transfer of data from a data source to a data utilization device.

An advantage of the invention is that it can be used for regulating data transfers to magnetic disc and tape storage devices as well as to high-speed line printers, or to any other data utilization device having a varying data utilization rate.

Briefly, in accordance with the invention, a data transfer regulating system is provided having input means for receiving and temporarily storing data units from a data source such as a host computer, and buffer storage means for temporarily storing the data units before transmission to a data utilization device such as a remote high-speed line printer. Control processor means control the transfer of data units between the input means and the buffer storage means. Available storage status means senses the amount of available storage capacity in the buffer storage means and generates a storage available signal having a value corresponding to the then available storage capacity. The control processor means is responsive to the storage available signal to transfer data units from the input means to the buffer storage means at a rate related to the value of the storage available signal. When the available storage capacity of the buffer storage means is above a given capacity, data units are transferred to it at a higher transfer rate than when the available storage capacity is below said given capacity.

In the preferred embodiment of the invention reduced to practice the buffer storage means comprises 24 memory locations of a random access memory, with each memory location having a storage length equal to one print line. When the available memory locations are between 24 and 12, the data transfer rate from the input means to the buffer storage means corresponds to a line printing rate of 33 lines per second. When the available memory locations are between 7 and 11 the data transfer rate corresponds to a line printing rate of 10 lines per second. When the available memory locations are between one and six the data transfer rate corresponds to a line printing rate of one line per second. When no memory locations are available the data transfer rate is zero.

Thus, at the beginning of a remote printing operation data is transferred from the host computer to the buffer storage means at a very high rate. If there is a burst of communications errors, the data starts to pile up in the buffer storage means as print lines are retransmitted and the transfer rate slows to about one-third of the highest rate. And when the buffer storage means is almost full the rate drops to 3% of the highest rate. But even at such a slow rate, data transfers from the host computer continue without invoking a data error recovery process and thus stopping the smooth flow of data from the host computer to the remote high-speed line printer.

BRIEF DESCRIPTION OF THE DRAWINGS

Other objects, advantages and features of the invention will be apparent from the detailed description of the preferred embodiment of the invention which follows taken together with the accompanying drawings in which.

DETAILED DESCRIPTION OF PREFERRED EMBODIMENT OF INVENTION

Figure 1:
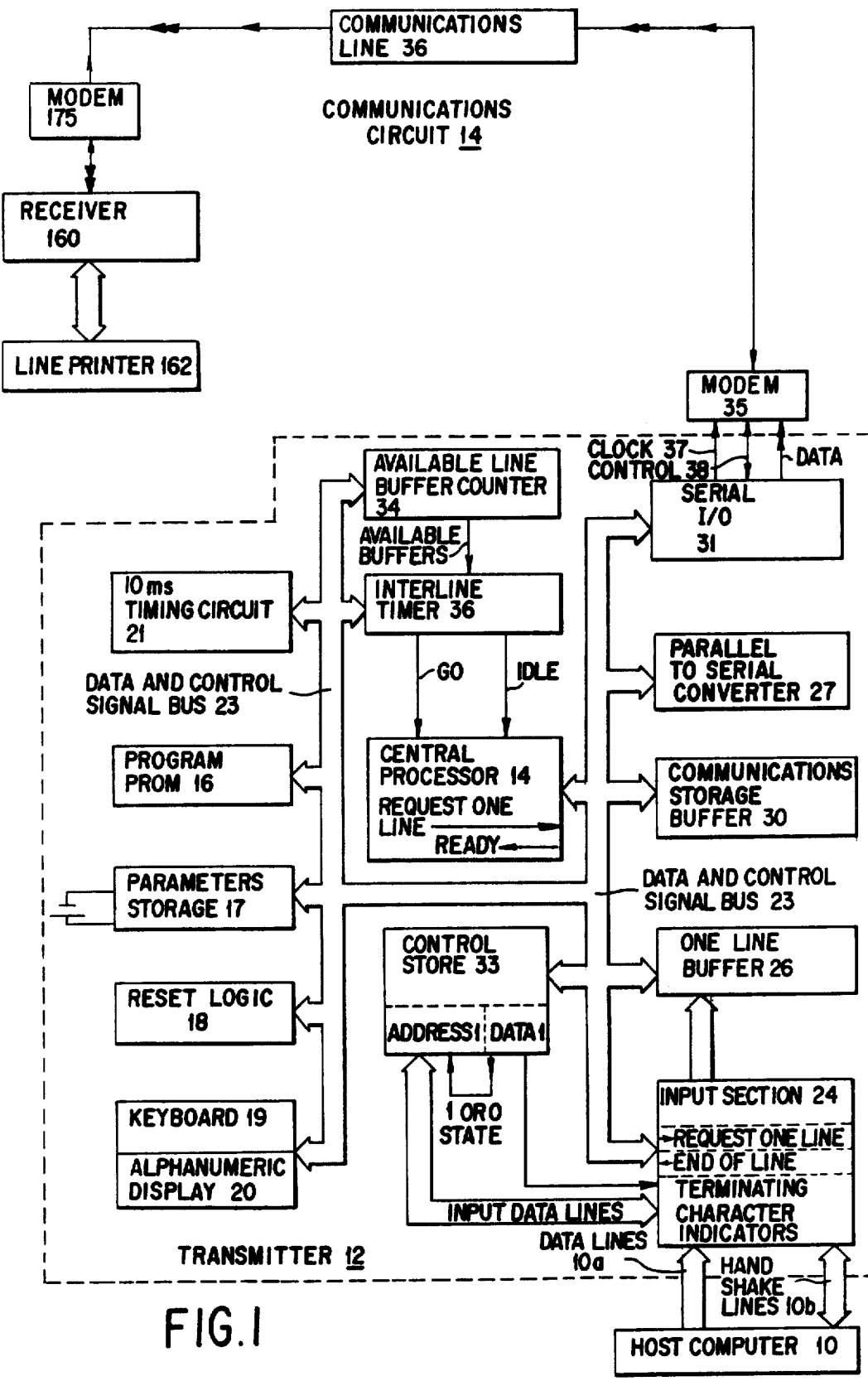
FIG. 1 is a block diagram of a transmitter which regulates the transfer of data from a host computer via a communications circuit to a remote receiver which drives a high-speed line-by-line printer.

Referring to FIG. 1, it should be noted that thick arrow-headed lines represent buses which carry both data and control signals, double-headed arrows represent data flow and single-headed arrows represent control signals.

Moreover, those blocks of FIG. 1 which have the same reference character numbers as corresponding blocks in the above-identified U. S. Pat. No. 4,641,263 for the RLPS-1 system ("RLPS-1 system application"), unless otherwise indicated, are the same as and perform the same functions as in the RLPS-1 application.

Referring to the drawings and more particularly to FIG. 1, host computer 10 is coupled via transmitter 12, communications circuit 14 and receiver 160 to line printer 162. Communications circuit 14 comprises the communications line 36 and modems 35 and 175.

The transmitter 12 is preferably software controlled and for this purpose includes a conventional microprocessor, central processor 14, and program prom 16, connected via data and control signal bus 23. Additional hardware circuitry of transmitter 12 includes the parameters storage 17, reset logic 18, keyboard 19, alphanumeric display 20, 10 millisecond timing circuit 21, and, in the dataflow path, input section 24, one line buffer 26, parallel to serial converter 27 and serial I/O 31. The remaining memory is part of the system's DRAM. The balance of the blocks of transmitter 12---available line buffer counter 34 and interline timer 36---are software constructs. The hardware elements will be further described after the following description of operation.

DESCRIPTION OF OPERATION

The host computer 10 is coupled to input section 24 via data lines 10a, handshake lines 10b and request one line 10c. These connections are such that the input section 24 looks to the host computer 10 as a local high-speed line printer. The connecting lines are thus conventional. Handshake lines 10b perform the usual handshake functions including requesting data from the host computer , which transmits via data lines 10a a burst of parallel coded characters, comprising a line to be printed, to the input section 24. Each parallel character preferably comprises two bytes plus a parity bit, with an entire line consisting of up to 1023 characters plus a vertical formatting unit such as a line feed.

Under control of central processor 14 a line of data is loaded into one line buffer 26, upon the transmission from the central processor 14 of a request one line signal to the input section 24. When the last character of the line is loaded into one line buffer 26, input section 24 transmits an end of line signal to the central processor 14, which produces a ready signal, which functions as an interrupt to cause the central processor to cease other operations and process the line of data in the one line buffer 26. The principle data processing is data compression in order to reduce the transmission of iteration of the same characters. For example, a 2-character control and space-count code may be substituted for any sequence of three or more spaces or repeated characters, such as zeros between printable characters within a print line. It has been found that this compression may result in reduction of up to 30 percent in transmission costs as a result of the reduction of time required for transmission of messages.

Central processor 14 processes the data in one line buffer 26 on the fly and stores it in communications storage buffer 30. From the communications storage buffer 30, the data is converted from parallel to serial by parallel to serial converter 27 and, via serial I/O 31 and communications circuit 14, is transmitted to receiver 160. Receiver 160 converts the data to parallel form, decompresses the data, checks it for errors and line completion, and if any part of the line is incorrect sends a retransmit signal back to the transmitter 12. But if the line is correct and complete, receiver 160 transmits it to line printer 162 for printing, and seconds an acknowledgment signal back to transmitter 12 to acknowledge receipt of that line of data, which is then erased from communications storage buffer 30.

Communications storage buffer 30 preferably stores up to 24 lines of data. Central processor 14 feeds compressed lines into it and transmits compressed lines from it. If the receiver 160 repeatedly calls for retransmitted lines, the communications storage buffer starts to fill up. If it fills up completely, central processor 14 stops requesting lines from the host computer 10. Usually, the host computer 10 is programmed to expect a line request at least once a second. If more than a second goes by, the host computer 10 assumes that some error has occurred and enters into an error recovery process, which undesirably diverts it from its other processing functions.

In accordance with the invention, transmitter 12 functions to regulate or throttle the transfer of lines of data from the host computer 10 to the communications storage buffer 30 so as to delay, as long as possible, the complete filling of the communications storage buffer 30. This is accomplished by transferring lines from the host computer 10 to the communications storage buffer 30 at three different transfer rates; preferably at transfer rates corresponding to line printing rates of 33 lines per second, 10 lines per second or one line per second. Those printing line rates correspond respectively to one line every 30 milliseconds, one line every 100 milliseconds and one line every 1000 milliseconds.

Available line buffer counter 34 keeps track of the number of available line storage registers in the communications storage buffer 30 and, between transfers of lines from the one line buffer 26 to the communications storage buffer 30, transmits the number of available buffers to interline timer 36, which keeps time in 10 millisecond increments in response to 10 ms timing circuit 21. If the number of available buffers is between 12 and 24, interline timer 36 sets the interline time to 30 milliseconds by transmitting a go signal to the central processor 14. More particularly, interline timer 36 keeps track of the time of the last transfer of a completely processed line from the one line buffer 26 to the communications storage buffer 30, subtracts the processing time for the next line from the 30 milliseconds interline time and sends the go signal to the central processor 14 at the end of the difference in time between 30 milliseconds and the processing time.

Upon receipt of the go signal the central processor 14 sends a request one line signal to the input section 24 which obtains one line from the host computer 10 and stores it in the one line buffer 26. Then the central processor 14, as indicated above, responds to an end of line signal from the input section to process the line stored in the one line buffer 26 on the way to its storage in the communications storage buffer 30.

If the available line buffer counter 34 has a count of available line storage buffers in the communications storage buffer 30 between 7 and 11, the interline timer 36 sets the interline time to 100 milliseconds after taking into account the intervening line processing time, and then sends a go signal to central processor 14 to request another line from the host computer 10.

If the available line buffer counter 34 has a count of available line storage buffers in the communications storage buffer 30 between 1 and 6, the interline timer 36 sets the interline time to 1000 milliseconds, one second, after taking into account the intervening line processing time, and then sends a go signal to central processor 14 to request another line from the host computer 10.

If the available line buffer counter 34 has a zero count of available line storage buffers in the communications storage buffer 30, then the interline timer 36 sends an idle signal to central processor 14, and no request one line signal is sent to the input section 24. Thus, after a short period of time after one second from the last requested line, host computer 10 then goes into an error recovery program, which is undesirable but, at that point, unavoidable.

FIGS. 2A-2D are flow charts of the transmitter 12 program which regulates the rate of data transfer from the host computer 10 to the communications storage buffer 30 and thus to the remote line printer 162.

Initially, upon start up of the system, the pertinent parameters are stored in parameters storage 17, which has a backup battery to insure that the parameters are not lost if there is a loss of power. Reset logic 18 sets the remaining conditions of the system for start up. The paramaters are entered via keyboard 19 and are simultaneously displayed on alphanumeric display 20.

Figure 2D:
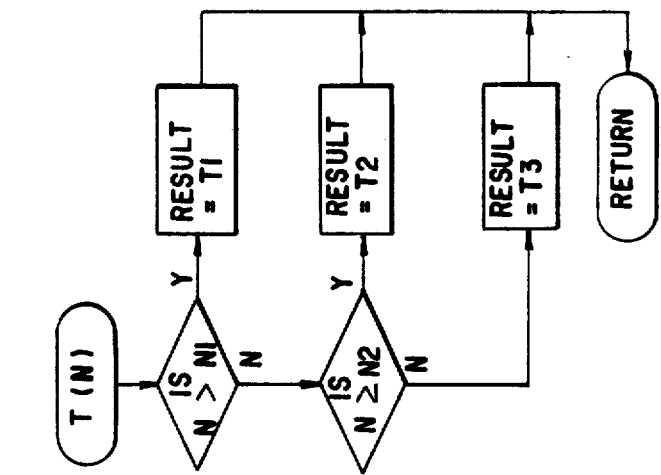
FIGS. 2A-2D are flow charts of the transmitter program which regulates the rate of data transfer from the host computer to the remote high-speed printer.
Figure 2C:
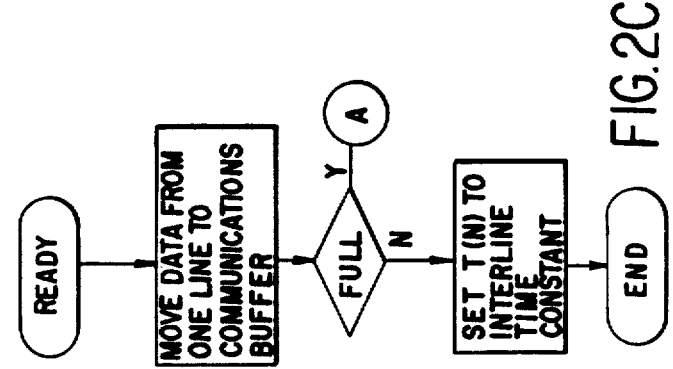
Figure 2B:
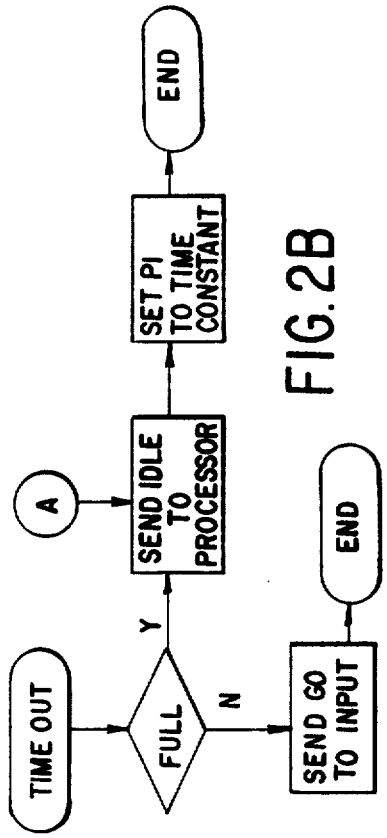
Figure 2A:
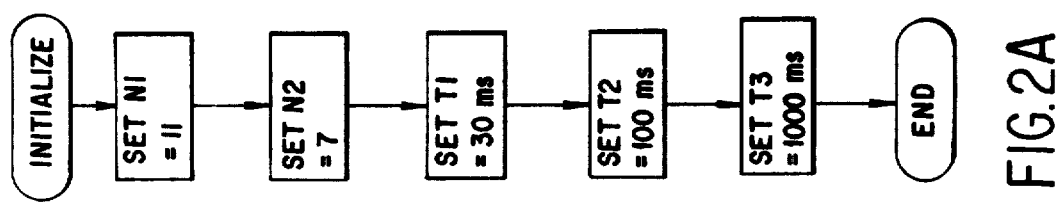

FIG. 2A is the flow diagram for initializing the tranmsitter 12. In sequence, N1 is set to 11, N2 to 7, T1 to 30 milliseconds, T2 to 100 milliseconds and T3 to 1000 milliseconds.

FIG. 2B is the flow diagram for starting the data transfer regulation process. If the communications storage buffer 30 is full there are zero available line buffer registers and idle is sent to central processor 14. The interline time is then arbitrarily set to 10 milliseconds, when the process will repeat. If the available line buffer counter 34 again shows that zero buffers are available, the idle signal wil be repeated. But if during the 10 millisecond interval, the communications storage buffer 30 has been emptied of one or more of its lines of storage, that is it is not full, then the interline timer 36 sends a go signal to central processor 14 and it requests a line from the host computer 10 via input section 24.

Referring to FIG. 2C, the go signal produces a consequent request for one line by the central processor 14. The input section 24 sends the request one line signal to the host computer 10 to transmit one line to the one line buffer 26. The central processor 14, upon receiving an end of line signal generates the ready signal which results in moving the one line of data to the communications storage buffer 30 while processing the data, including compressing it, on the fly. Then the communications storage buffer 30 is probed to see if it is full. If so, the program proceeds back to the flow diagram of FIG. 2B to generate an idle. If the communications storage buffer is not full, the interline time constant is set to 30, 100 or 1000 milliseconds, depending on the amount of available line buffer registers.

FIG. 2D is the flow diagram for setting the interline time constant. If N, the number of available buffers, is greater than N1, that is 11, the interline time constant is set to T1, that is 30 milliseconds. If N1 is not greater than N1 or 11, then N is tested to see if it is equal or greater than N2, that is 7. If so, then the result is T2, or an interline time constant of 100 milliseconds. If not, that is N is between 1 and 6, then the result is T3, an interline time constant of 1000 milliseconds.

ADDITIONAL DESCRIPTION OF HARDWARE ELEMENTS

The following are preferred embodiments of the hardware elements of the transmitter 12.

The central processor 14 is a Z80A microprocessor. The Z80A executes a stored program and has control over the peripheral devices of the system.

The reset logic 18 provides a clean reset signal to the central processor 14 during power up and power fail conditions. The reset logic 18 is also used by the paramaters storage 17, a CMOS RAM circuit, to protect its contents during power up and power down.

The communications storage buffer 30 is part of a DRAM, which consists of 8 64K bit memory devices type 4164.

The program prom 16 consists of 2 8 K byte memory devices type 2764.

The parameters storage 17, a CMOS RAM, consists of a single 2 K byte device type 5117 and circuits to supply battery and protect the device contents during reset.

The one line buffer 26 is a 2 K by 8 device which is two port. Locations are written from the input section 24 and read or written by the central processor 14. The input section 24 writes two bytes per character. The one line buffer 26 holds a maximum of 1024 characters.

The Serial I/O 31 is a Z80A SIO (Serial Input/Output) chip.

The input section 24 conducts the handshake with the host system, writes characters into the one line buffer 26 and reacts to the action bits of the control store 33, hereinafter discussed in greater detail. The input section 24 also provides several control status signals to the host computer 10 through a Z80A PIO (Parallel Input/Output) circuit written by the central processor 14.

The 10 ms timing circuit 21 is a Z80A CTC (Counter Timer Circuit) that provides four timing channels. Two of these are hardware clocks for the Z80A SIO chip, the Serial I/O 31, . A third provides an interrupt to the central processor 14 every 10 millisecond (nominal) for time keeping functions. The fourth timing channel is for an audio alarm.

The keyboard 19-alphanumeric display 20 are on the front panel implemented by a front panel I/O. They provide for operator communication.

CONTROL STORE 33

Control store 33 provides a separate feature of the invention--a programmed sequential state machine for interpreting terminating characters different ways.

The control store 33 is a two port memory device organized 2 K by 3 bits and implemented with 6116 type devices. The control store 33 is written by the central processor 14. It is subsequently read by the input section 24. As each character is presented by the host computer 10, its character code bits are presented as addresses to the control store 33 memory. The 3 bit word that is read as a result indicates the action that should be taken on this character. There are 3 action bits. The first indicates whether or not a parity error is to be declared. The second indicates whether the interface is to stop fetching data as a result of this character. The third bit indicates which of two states the interface is to assume. The state bit is fed back as an address on subsequent character cycles which allows separate actions to be programmed for both states.

The control store 33 has a memory which gets loaded up by the central processor 14 with 3 bit values. They indicate which characters are to be terminating characters. That is important for emulation by the transmitter 12 of different kinds of high-speed line printers, since different printers have different terminating character codes. For example, a carriage return may or may not be a terminating character.

More particularly, the control store 33's state bit can be a one or a zero. That state bit controls the input section 24's interpretation of characters. For example, if a character comes down which indicates the start of a vertical formatting unit (VFU) load, the control store 33 will assume state one. When a subsequent carriage return comes down, it will go to a different location if in state one rather than state zero, to tell the system what it should do on receipt of that carriage return.

For example, assume the code for a carriage return is 13. The memory store 33 will respond differently to that code depending on whether it is in state one or state zero. The carriage return code 13 is stored in the one line buffer 26 at an address determined by an address counter. At the same time the code 13 is interpreted by the control store 33 as address 13, which tells the system what to do when a code 13 is received. Initially, the control store 33 is in one state, zero or one. If the control store 33 is in state zero, it reads a code 13 as a carriage return. If the control store 33 is in state one, that same code 13 would be interpreted as part of VFU load data. Other codes change the state from zero to one or from one to zero. Say the input section 24 receives a code 357, which means enter the VFU load state. When code 357 is presented to the control store 33 in the non-VFU load state it produces a bit which says now go into the VFU load state, which is one. All subsequent data will now be interpreted in the VFU load state. Another code, 356, which means end the VFU load state, puts the state back to zero and acts as a terminating character. So by programming of control store 33, the system can control how terminating characters are interpreted.

RECEIVER 160

Referring to the receiver 160, it is basically a transmitter 12 operating in reverse. That is, the communications circuit 14 communicates the data signals, clock 37 signals and control 38 signals serially. The receiver 160 converts these signals from serial to parallel to process them with its own central processor 14. For example, the data is decompressed, examined for errors and line completion and, via a printer IO (a Z80A PIO circuit which accomplishes the handshake required by the line printer 162) is transmitted to a line printer 162 for printing. If a line is ready for printing, the receiver 160 sends an acknowledgment signal to the transmitter 12. Frames of data are acknowedged after intermediate frames have been transmitted to the receiver 160. The transmitter 12 recognizes which frame has been acknowledged and erases the corresponding line of data in the communications storage buffer 30. When a frame is not acknowledged within a predetermined period of time, it is automatically retransmitted.

Returning to the transmitter 12, not shown is a banking control whose logic provides access to program prom 16, parameter storage 17, one line buffer 26, communications storage buffer 30 and control store 33, depending on a selected memory mode.

While the invention has been disclosed and described with reference to a preferred embodiment, the best mode, it will be apparent that variations and modifications may be made therein, and it is therefor intended in the following claims to cover each such variation and modification in accordance with the true spirit and scope of the invention.

I claim:

1. A system for recording at a remote location and at a varying recording rate digital data stored in a data source comprising:
   (a) input means responsive to said data source for receiving and temporarily storing data units to be recorded at said remote location at said varying recording rate, digital data from said data source being available at a higher rate than the highest rate of said varying recording rate;
   (b) buffer storage means for temporarily storing a plurality of data units before transmission to said remote location;

(c) available storage status means responsive to said buffer storage means for sensing the amount of available storage capacity in said buffer storage means and generating a storage available signal having a value corresponding to the then available storage capacity;

(d) control processor means coupled to said input means and said buffer storage means for transferring data units stored in said input means to said buffer storage means;

(e) recording means at said remote location for recording data units at varying recording rates; and (f) communications means coupled between said buffer storage means and said recording means for transmitting data units to said recording means;

(g) said control processor means being responsive to a storage available signal from said available storage status means to transfer data units from said data source via said input means to said buffer storage means at a rate corresponding to the value of said storage available signal;

(h) said control processor means including means for transferring data units to said buffer storage means at a predetermined rate when the available storage capacity is above a predetermined capacity, and at a lower rate than said predetermined rate when the available storage capacity is below said predetermined capacity.

2. A system for recording digital data at a remote location according to claim 1 wherein said control processor means comprises central processing means and further comprising:

(i) timer means also included in said control processor means for timing the transfer of data units from said data source via said input means to said buffer storage means by transmitting (generating) a transfer signal to said central processing means after a predetermined time.

3. A system for recording digital data at a remote location according to claim 2 wherein when said storage available signal has a value which is above a predetermined value said timer means generates a transfer signal after an interline time which is lower than the interline time when said storage available signal has a value which is below a second predetermined value.

4. A system for recording at a remote location and at a varying recording rate digital data stored in a data source comprising:

(a) input means responsive to said data source for receiving and temporarily storing data units to be recorded at said remote location;

(b) buffer storage means for temporarily storing a plurality of data units before transmission to said remote location;

(c) available storage status means responsive to said buffer storage means for sensing the amount of available storage capacity in said buffer storage means and generating a storage available signal having a value corresponding to the then available storage capacity;

(d) control processor means coupled to said input means and said buffer storage means for transferring data units stored in said input means to said buffer storage means;

(e) recording means at said remote location for recording data units at varying recording rates; and (f) communications means coupled between said buffer storage means and said recording means for transmitting data units to said recording means;

(g) said control processor means being responsive to a storage available signal from said available storage status means to transfer data units from said data source via said input means to said buffer storage means at a rate corresponding to the value of said storage available signal;

(h) timer means included in said control processor means for timing the transfer of data units from said data source via said input means to said buffer storage means by generating a transfer signal after a predetermined interline time, said transfer signal being transmitted to said data source;

(i) wherein when said storage available signal has a value which is above a first predetermined value said timer means generates a transfer signal after a first interline time, when said storage available signal has a value below a second predetermined value said timer means generates a transfer signal after a second interline time, and when said storage available signal has a value between said first and second predetermined values, said timer means generates a transfer signal after a third interline time between said first and second interline times.

5. A system for recording digital data at a remote location according to claim 4 wherein said first predetermined value is 11 and said first interline time is 30 milliseconds, said second predetermined value is 7 and said second interline time is 1000 milliseconds, and said third interline time is 100 milliseconds.

6. A system for recording digital data at a remote location according to claim 3 wherein said data source is a host computer and said recording means at said remote location is a line printer.

7. A system for recording data at a remote location according to claim 6 further including receiver means driving said line printer and a communications circuit coupled between said buffer storage means and said receiver means.

8. A system for recording digital data at a remote location according to claim 4 wherein said data source is a host computer and said recording means at said remote location is a line printer, and further including receiver means driving said line printer and a communications circuit coupled between said buffer storage means and said receiver means.

9. A system for recording digital data at a remote location according to claim 3 wherein said input means comprises an input section feeding a one line buffer means.

10. A system for recording digital data at a remote location according to claim 8 wherein said input means comprises an input section feeding a one line buffer means.

11. A system for recording digital data at a remote location according to claim 2 wherein said control processor means processes data in a processing time as the data is transferred from said input means to said buffer storage means, and said timer means subtracts said processing time from said predetermined interline time to transmit a print line request signal to said data source after the difference in time between said predetermined interline time and said processing time.

12. A system for recording digital data at a remote location according to claim 9 wherein said control processor means processes data in a processing time as it is transferred from said one line buffer means to said buffer storage means, and said timer means subtracts said processing time from said predetermined interline time to transmit a print line request signal after the difference in time between said predetermined interline time and said processing time.

13. A system for recording at a varying recording rate digital data stored in a data source comprising:
   (a) buffer storage means responsive to said data source for temporarily storing a plurality of data units before recording at said varying recording rate, digital data from said data source being available at a higher rate than the highest rate of said varying recording rate;
   (b) storage status means responsive to said buffer storage means for sensing the storage capacity in said buffer storage means and generating a storage capacity signal having a value corresponding to the then available storage capacity;
   (c) control processor means coupled to said data source and said buffer storage means for transferring data units stored in said data source to said buffer storage means;
   (d) recording means for recording data units at varying recording rates; and
   (e) transmitting means coupled between said buffer storage means and said recording means for transmitting data units to said recording means;
   (f) said control processor means being responsive to a storage capacity signal from said storage status means to transfer data units from said data source to said buffer storage means at a rate corresponding to the value of said storage capacity signal;
   (g) said control processor means including means for transferring data units to said buffer storage means at a predetermined rate when the storage capacity is at a first predetermined capacity, and at a different rate than said predetermined rate when the storage capacity is at a second predetermined capacity.

14. A system for recording digital data at a remote location according to claim 13 wherein said control processor means comprises central processing means and further comprising:
   (h) timer means also included in said control processor means for timing the transfer of data units from said data source via said input means to said buffer storage means by transmitting a transfer signal to said central processor means after a predetermined interline time.

15. A system for recording at a varying recording rate digital data stored in a data source comprising:
   (a) buffer storage means responsive to said data source for temporarily storing a plurality of data units before recording;
   (b) storage status means responsive to said buffer storage means for sensing the storage capacity in said buffer storage means and generating a storage capacity signal having a value corresponding to the then available storage capacity;
   (c) control processor means coupled to said data source and said buffer storage means for transferring data units stored in said data source to said buffer storage means;
   (d) recording means for recording data units at varying recording rates; and
   (e) transmitting means coupled between said buffer storage means and said recording means for transmitting data units to said recording means;
   (f) said control processor means being responsive to a storage capacity signal from said storage status means to transfer data units from said data source to said buffer storage means at a rate corresponding to the value of said storage capacity signal;
   (g) said control processor means including means for transferring data units to said buffer storage means at a predetermined rate when the storage capacity is at a first predetermined capacity, and at a different rate than said predetermined rate when the storage capacity is at a second predetermined capacity; and
   (i) timer means included in said control processor means for timing the transfer of data units from said data source to said buffer storage means by transmitting a print line request signal to said data source after a predetermined interline time;
   (j) wherein said control processor means processes data in a processing time as the data is transferred from said data source to said buffer storage means, and said timer means subtracts said processing time from said predetermined interline time to transmit a print line request signal to said data source after the difference in time between said predetermined interline time and said processing time.

16. The system for recording at a remote location and at a varying recording rate digital data stored in a data source according to claim 2 wherein said data source is a host computer and said recording means is a high speed line printer.

17. The system for recording at a remote location and at a varying recording rate digital data stored in a data source according to claim 9 wherein said data source is a host computer and said recording means is a high speed line printer.

18. The system for recording at a remote location and at a varying recording rate digital data stored in a data source according to claim 12 wherein said data source is a host computer and said recording means is a high speed line printer.

19. The system for recording at a remote location and at a varying recording rate digital data stored in a data source according to claim 13 wherein said data source is a host computer and said recording means is a high speed line printer.

* * * * *